(12) United States Patent
De Goes

(10) Patent No.: US 10,984,581 B2
(45) Date of Patent: Apr. 20, 2021

(54) UV TRANSFER

(71) Applicant: Pixar, Emeryville, CA (US)

(72) Inventor: Fernando Ferrari De Goes, Berkeley, CA (US)

(73) Assignee: Pixar, Emeryville, CA (US)

(*) Notice: Subject to any disclaimer, the term of this patent is extended or adjusted under 35 U.S.C. 154(b) by 0 days.

(21) Appl. No.: 16/514,816

(22) Filed: Jul. 17, 2019

(65) Prior Publication Data

US 2021/0019931 A1 Jan. 21, 2021

(51) Int. Cl.
| | |
|---|---|
| *G09G 5/00* | (2006.01) |
| *G06T 15/04* | (2011.01) |
| *G06T 19/20* | (2011.01) |
| *G06T 11/00* | (2006.01) |
| *G06T 17/20* | (2006.01) |

(52) U.S. Cl.
CPC ............ *G06T 15/04* (2013.01); *G06T 11/001* (2013.01); *G06T 17/205* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 6,687,402 B1* | 2/2004 | Taycher | G06K 9/6204 382/199 |
| 7,760,201 B2 | 7/2010 | Couture-Gagnon | |
| 2009/0238404 A1* | 9/2009 | Orderud | G06T 7/149 382/103 |
| 2010/0053172 A1* | 3/2010 | DeRose | G06T 13/00 345/473 |
| 2016/0027200 A1* | 1/2016 | Corazza | G06K 9/00362 345/420 |
| 2018/0089883 A1* | 3/2018 | De Goes | G06T 11/001 |
| 2019/0304200 A1* | 10/2019 | Jeon | G06T 19/20 |

* cited by examiner

*Primary Examiner* — Anh-Tuan V Nguyen
(74) *Attorney, Agent, or Firm* — Patterson + Sheridan, LLP

(57) ABSTRACT

Embodiments provide for cut-aware UV transfer. Embodiments include receiving a surface correspondence map that maps points of a source mesh to points of a target mesh. Embodiments include generating a set of functions encoding locations of seam curves and wrap curves from a source UV map of the source mesh. Embodiments include using the set of functions and the surface correspondence map to determine a target UV map that maps a plurality of target seam curves and a plurality of target wrap curves to the target mesh. Embodiments include transferring a two-dimensional parametrization of the source UV map to the target UV map.

7 Claims, 7 Drawing Sheets

UV TRANSFER

BACKGROUND

This disclosure relates to computer animation and computer generated imagery. More specifically, this disclosure related to techniques for transferring UV maps between meshes with different connectivity.

Animators and computer graphics artists can rely upon computers to assist in the animation and computer generated imagery process. This may include using computers to represent shapes with virtual models in computer memory. This may also include using computers to facilitate animation, for example, by the designing, posing, deforming, coloring, painting, or the like, of characters or other computer-generated models.

The production of animated features and computer generated imagery (CGI) may involve the extensive use of computer graphics techniques to produce a visually appealing image from the geometric description of an object or model that can be used to convey an element of a story. One issue with the production process is the time and effort involved when an animator undertakes to create the geometric description of a model and the model's associated textures, paint data, deformations, and the like. For example, textures are often mapped onto three-dimensional models by creating "UV maps", which map two-dimensional texture images to meshes of models. "U" and "V" are the names of the axes of a two-dimensional plane, as "X", "Y", and "Z" are the names of axes in a three-dimensional space. Because UV maps are defined with respect to particular meshes, adding textures to new models with distinct meshes generally requires creating new UV maps. In some cases, it may take several hours to several days for an animator to create a UV map for a model.

Accordingly, there is a need in the art for techniques of transferring UV maps between three-dimensional models with different meshes.

SUMMARY

Embodiments include methods for cut-aware UV transfer, comprising: receiving a surface correspondence map that maps points of a source mesh to points of a target mesh; generating a set of functions encoding locations of seam curves and wrap curves from a source UV map of the source mesh; using the set of functions and the surface correspondence map to determine a target UV map that maps a plurality of target seam curves and a plurality of target wrap curves to the target mesh; and transferring a two-dimensional parametrization of the source UV map to the target UV map.

Other embodiments provide a non-transitory computer readable medium comprising instructions that, when executed by operation of one or more computer processors, causes the one or more computer processors to perform the above-referenced methods for cut-aware UV transfer.

Other embodiments provide a system comprising one or more processors and a non-transitory computer readable medium comprising instructions that, when executed by the one or more processors, causes the system to perform the above-referenced methods for cut-aware UV transfer.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

A three-dimensional model may be represented by a mesh comprising a collection of vertices, edges, and faces defining the shape of a polyhedral object. The faces may be triangles, quadrilaterals, or other types of polygons. Meshes are used as a reference point for defining various attributes of three-dimensional models, such as textures. In one example, a two-dimensional image is mapped as a texture onto the surface of a character represented by a three-dimensional model via a UV map that maps the texture to vertices, edges, and/or faces of a mesh of the three-dimensional model.

UV mapping is a method for texturing digital surfaces in computer graphics. The generation of UV maps amounts to the selection of edges of a mesh that cut the mesh open, combined with a parametrization that unwraps the mesh to a two-dimensional plane. Despite algorithmic advances, the design of UV maps is still laborious and often involves extensive artistic effort. To alleviate the burden of creating high-quality UV maps, one approach is to share and reuse UV maps between multiple meshes. However, changes between meshes such as different connectivity (e.g., different vertices and edges) tend to damage the mapping, especially near cut edges, which may result in distortion of textures. As such, there is a need for improved techniques for transferring UV maps between meshes that have different connectivity.

Embodiments of the present disclosure allow a UV map to be transferred from a source mesh to a target mesh by techniques that adapt an original cut layout of the UV map to a target mesh while preserving the distortion of the original parametrization. Techniques described herein involve performing structural analysis of a source UV map and then reconstructing the source UV map on a target mesh. In one example, a series of functions are generated that encode the location, arrangement, and type of UV cuts in the source UV map. Equipped with these "cut-aware" functions, the UV cuts from the source UV map can be transferred and adapted to any target mesh, regardless of its tessellation (e.g., tiling or division of vertex sets into polygons suitable for rendering), to produce a target UV map.

These functions are further employed to identify regions on the target mesh that mismatch the source cut layout. The two-dimensional parametrization is transferred from the source UV map to the target UV map as an optimization that minimizes the discrepancy between the target UV map and the source UV map, while smoothly extrapolating the parametrization from the source UV map throughout the mismatched areas.

Figure 1:
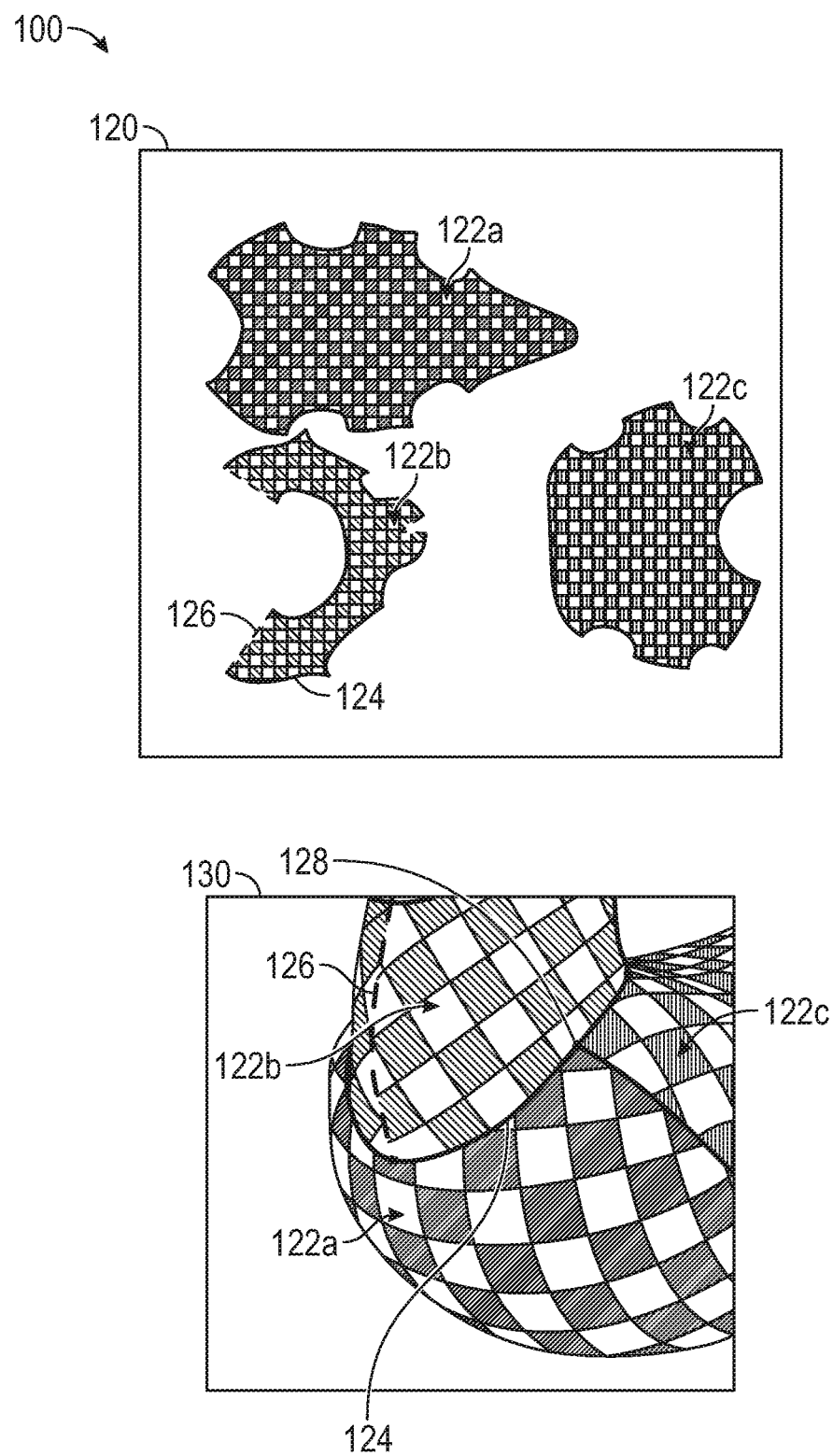
FIG. 1 illustrates an example of a UV map.

FIG. 1 illustrates an example 100 of a UV map. Example 100 includes a visual representation of a UV map 120 and an illustration of UV map 120 fit to a three-dimensional model 130. While not depicted, the geometry of model 130 is defined by a mesh, and the cuts (e.g., 126) in UV map 120 are defined relative to edges of the mesh.

UV map 120 includes a plurality of patches 122a, 122b, and 122c that represent portions of model 130 that have been separated by cuts, such as seam cut 124 and wrap cut 126. As shown in model 130, seam cut 124 represents a division between patch 122a and patch 122b as well as a division between patch 122c and patch 122b. Wrap cut 126 does not divide separate patches, but falls within patch 122b, representing a point at which patch 122b is cut so that it can be "unwrapped" to a two-dimensional plane as illustrated in UV map 120.

Generating a UV Map

UV map 120 is constructed with respect to model 130 by assigning a two-dimensional point (e.g., a UV value) to each face corner in the mesh of model 120. A face corner generally refers to a point on a face that corresponds to one of the vertices that define the face. The mesh of model 130 is referred to as M. The vertices, edges, and faces in M are referred to by the symbols v, e, and f, respectively. The symbol n is used to indicate the vertex count in M, and the copy of a vertex inside a face is referred to as a face corner. Vertices are also given three-dimensional positions $\{x_v\}$, which define the surface through barycentric interpolation over each face. A point x inside a face f can then be associated with a vector b(x) of size n that contains the barycentric coordinates of x with respect to the vertices of f, and zero for the remaining vertices. In the case of a polygonal face, generalized barycentric coordinates are used.

In generating the UV map, an edge of M is tagged as a cut if one or both of its vertices have different UV values in the incident face corners (e.g., the vertices located at the corners of the faces to which they belong), thus forming a UV discontinuity. By the cut edges, M is split open into a set of open sub-meshes $\{M_i\}$ that represent disconnected UV components, a.k.a. UV shells. Since the face corners of a given shell vertex share a common UV value, the UV map u restricted to $M_i$ can be expressed by a parametrization $u_i$: $M_i \rightarrow R^2$. This function can be evaluated at any point x inside $M_i$ via the interpolation $u_i(x)=b_i(x)^t U_i$, where $U_i$ encodes a matrix of size $n_i \times 2$ with one vertex UV per row.

The UV shells also define a face-based segmentation of M, and the face-set of each UV shell on M is generally referred to as a patch (e.g., patches 122a, 122b, and 122c). A vertex in M is labeled as an anchor if it is incident to only one cut edge or incident to more than two cut edges. For example, anchor 128 is incident to three cut edges. A cut curve is defined as the sequence of cut edges in M connecting two anchor vertices, such as seam cut 123, or forming a loop. Cut curves and their respective edges are classified in two types: a seam is a cut that has its incident faces assigned to different patches (e.g., seam cut 124), while a wrap is a cut with both incident faces shared by the same patch (e.g., wrap cut 126). Boundary edges are tagged as seam cuts by default.

Embodiments of the present disclosure allow a UV map, such as UV map 120 to be transferred from a source mesh to a target mesh while maintaining the two-dimensional parametrization of the UV map.

Transferring a UV Map

In certain examples, a UV map u is constructed on a target mesh by transferring a UV map $\bar{u}$ from a source mesh $\bar{M}$. Source and target meshes can have different connectivity and, possibly, distinct shapes and/or topologies. A surface correspondence map $\Gamma: M \rightarrow \bar{M}$ is used, providing a point-to-point mapping from $\bar{M}$ to M. In some cases, $\Gamma$ can be computed using correspondence techniques or, in the specific case of meshes with similar shapes, generated based on spatial projections accelerated by a bounding volume hierarchy (BVH). A BVH is a tree structure corresponding to a set of geometric objects in which all geometric objects are wrapped in bounding volumes that form the leaf nodes of the tree. The leaf nodes are grouped into sets and enclosed within larger bounding volumes. These larger bounding volumes are also grouped and enclosed within other larger bounding volumes recursively, eventually resulting in a tree structure that has a single bounding volume at the top of the tree.

Techniques described herein may be organized resembling a copy-and-paste operation. In the copy stage, the layout of the mapping $\bar{u}$ on $\bar{M}$ is analyzed in order to generate functions that encode the location, arrangement, and type of its cuts. The paste stage is composed of two steps. First, the UV cuts that conform to the target tessellation are inferred by processing the functions transferred to M via $\Gamma$. Then, the two-dimensional parametrization of M is computed so that the mapping u reproduces $\bar{u}$ with minimal discrepancy.

Copying a UV Map from a Source Mesh

Figure 2A:
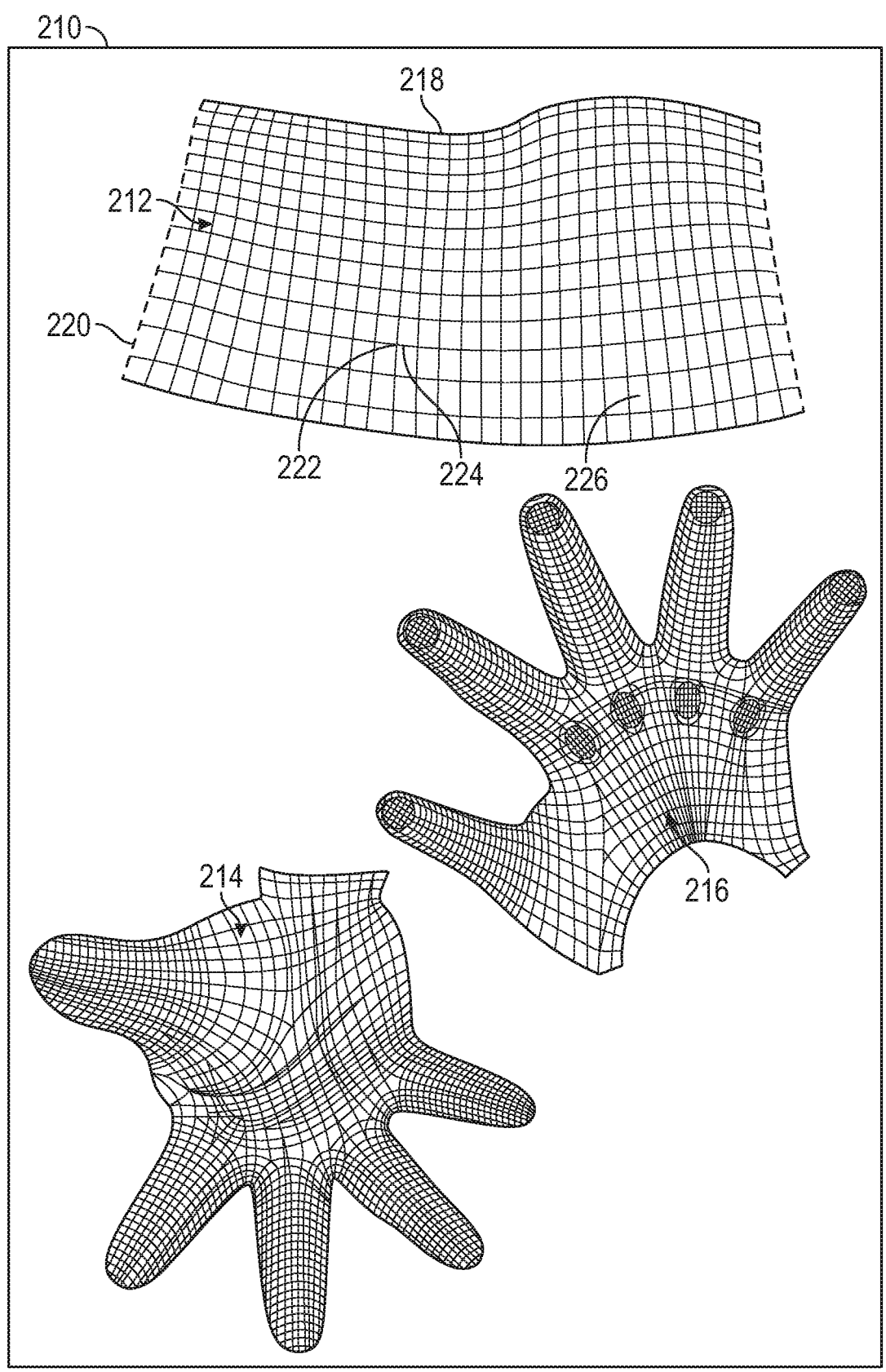
FIGS. 2A, 2B, and 2C illustrate an example of transferring a UV map from a source mesh to a target mesh.

FIG. 2A illustrates an example of a UV map 210 (e.g., $\bar{u}$) for a source mesh $\bar{M}$. UV map 210 includes a plurality of patches 212, 214, and 216 and a plurality of cuts, such as seam cut 218 and wrap cut 220. $\bar{M}$ includes vertices, edges, and faces, such as vertex 222, edge 224, and face 226.

UV map 210 represents a two-dimensional parametrization of a three-dimensional model of a human hand, with patch 212 representing the wrist, patch 214 representing the front of the hand, and patch 216 representing the back of the hand.

UV discontinuities take place at cut edges of a given mesh whose vertices receive multiple UV values. As a result, the structure of a UV map is attached to the mesh connectivity of the given mesh for which the UV map is defined. In order to transfer UVs to different meshes, an alternative UV representation is needed that is able to convey the location of its cuts oblivious to the mesh connectivity. To this end, the "copy" stage encodes the cut layout to a set of cut-aware functions indicating the location of seam and wrap curves produced by the mapping $\bar{u}$ on $\bar{M}$.

Figure 2B:
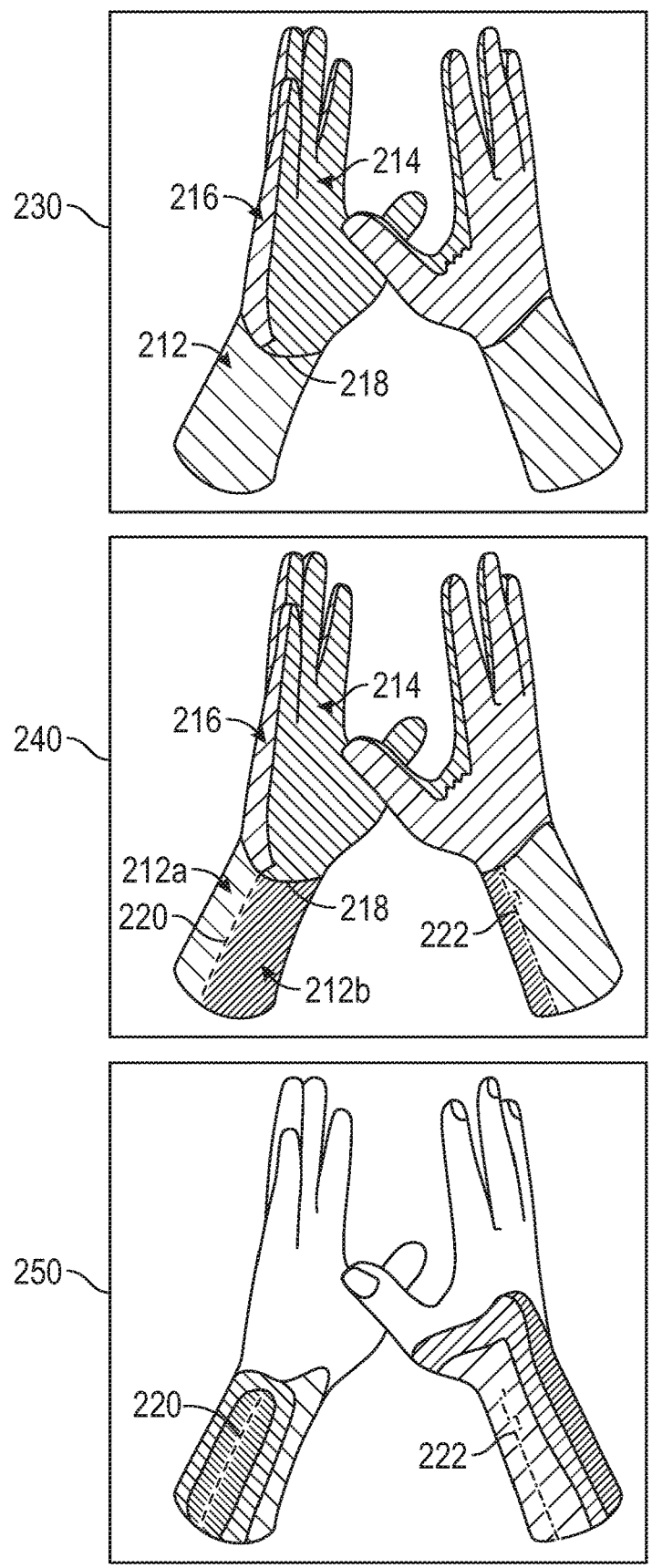

FIG. 2B illustrates techniques for generating functions that encode locations of seam curves and wrap curves from a source UV map $\bar{u}$ (e.g., UV map 210 of FIG. 2A) of a source mesh $\bar{M}$. (e.g., the mesh corresponding to patches 212, 214, and 216 of FIG. 2A)

Techniques begin with stage 230, where the representation of seam cuts is considered. An edge in $\bar{M}$ is labeled as a seam cut when it is positioned at the interface between two distinct patches of $\bar{u}$. Based on this definition, seam edges can be located by examining the mesh segmentation formed by the patches of $\bar{u}$ on $\bar{M}$. For example, as shown in stage 230, seam cut 218 separates patch 212 from patch 214, forming distinct segments. This segmentation can be encoded by enumerating the patches of $\bar{u}$, and then assembling a vector $\bar{p}$ that assigns every face f in $\bar{M}$ to its patch index i.

To abstract the mesh connectivity, indicator functions $\{\phi_i: \bar{M} \rightarrow R\}$ are generated, one per patch, that return 1 if a surface point x is inside the patch of index i, and otherwise return 0. Evaluating $\phi_i$ (x) inside a face f is computed by comparing the patch index i to $\bar{p}_f$. The patch indicator functions $\{\phi_i\}$ are sufficient to assert the seam edges present in $\bar{u}$, but they neglect the wrap edges. To address this issue, at stage 240, additional segmentations are constructed on $\overline{M}$ that split each patch of $\bar{u}$ into smaller sub-patches so that every wrap curve can be identified by a pair of sub-patches.

At stage 240, additional segmentation of patch 212 results in sub-patches 212a and 212b separated by wrap cut 220. Since a face can be shared by multiple wrap curves, a separate sub-patch segmentation is computed for each wrap curve. Given a wrap curve inside a patch, the faces incident to its wrap edges are seeded with tags indicating each side of the curve. If the curve ends at an anchor vertex formed exclusively by the intersection of wrap edges, an additional tag is used per cut to seed the remaining faces incident to the anchor, thus demarcating the curve endpoint. These tags are propagated throughout the patch faces using a multi-source flood-filling algorithm weighted by Euclidean distances between face barycenters. Similar to patches, the sub-patch segmentation associated with each wrap curve j is represented by allocating a vector $\bar{s}_{ij}$ that maps faces in the patch i to their respective sub-patch indices. The individual sub-patches are expressed using indicator functions $\{\psi_{ijk}: \overline{M} \to R\}$, one for each sub-patch k related to the wrap curve j inside the patch i. Evaluating $\psi_{ijk}$ (x) in a face f returns 1 if the patch index i equals $\bar{p}$ and the sub-patch index k equals $\bar{s}_{i,j,f}$, otherwise it returns 0.

While the edges bordering sub-patches (e.g., sub-patches 212a and 212b) contain the wrap curves (e.g., wrap cut 220), they also form curves (e.g., artificial curve 222) that are not in correspondence to any cut of $\bar{u}$. These extra curves are generated where the sub-patches grow away from the wrap curves and meet each other during the tag propagation. These curves are referred to as artificial curves.

To discriminate artificial and wrap curves, at stage 250, the encoding of each sub-patch segmentation $\bar{s}_{ij}$ is complemented with a scalar or harmonic function $h_{ij}: \overline{M} \to R$ that indicates the proximity of any surface point to the wrap curve j (e.g., wrap cut 220) within the patch i rather than its artificial curves (e.g., artificial curve 222). This function is computed by solving the Laplace's equation $\Delta h_{ij}=0$ on $\overline{M}$ with Dirichlet boundary conditions constraining the vertices of the wrap curve to 1, and the vertices of the respective artificial curves to −1. This equation is discretized on $\overline{M}$ using a polygonal Laplacian matrix, the sparse linear system is solved via a Cholesky factorization, and the resulting harmonic function is stored with values on vertices, which can be interpolated barycentrically within the faces of $\overline{M}$. The resulting harmonic function is illustrated in stage 250 as a heat map that shows denser patterns near wrap cut 220 and sparser patterns near artificial curve 222.

In summary, the copy operation expands the encoding of a UV map $\bar{u}$ with face-varying and vertex-varying vectors. The face-varying vector defines indicator functions that describe the mesh segmentations induced by the arrangement of seam and wrap curves on $\overline{M}$ (e.g., illustrated at stages 230 and 240), while the vertex-varying vector indicates scalar functions revealing the location of wrap curves (e.g., illustrated at stage 250). As described below, these "cut-aware" functions (e.g., the indicator functions and the scalar functions) are used to reconstruct the UV layout of the source map $\bar{u}$ transferred to the tessellation of a target mesh M.

Pasting a UV Map on a Target Mesh

Figure 2C:
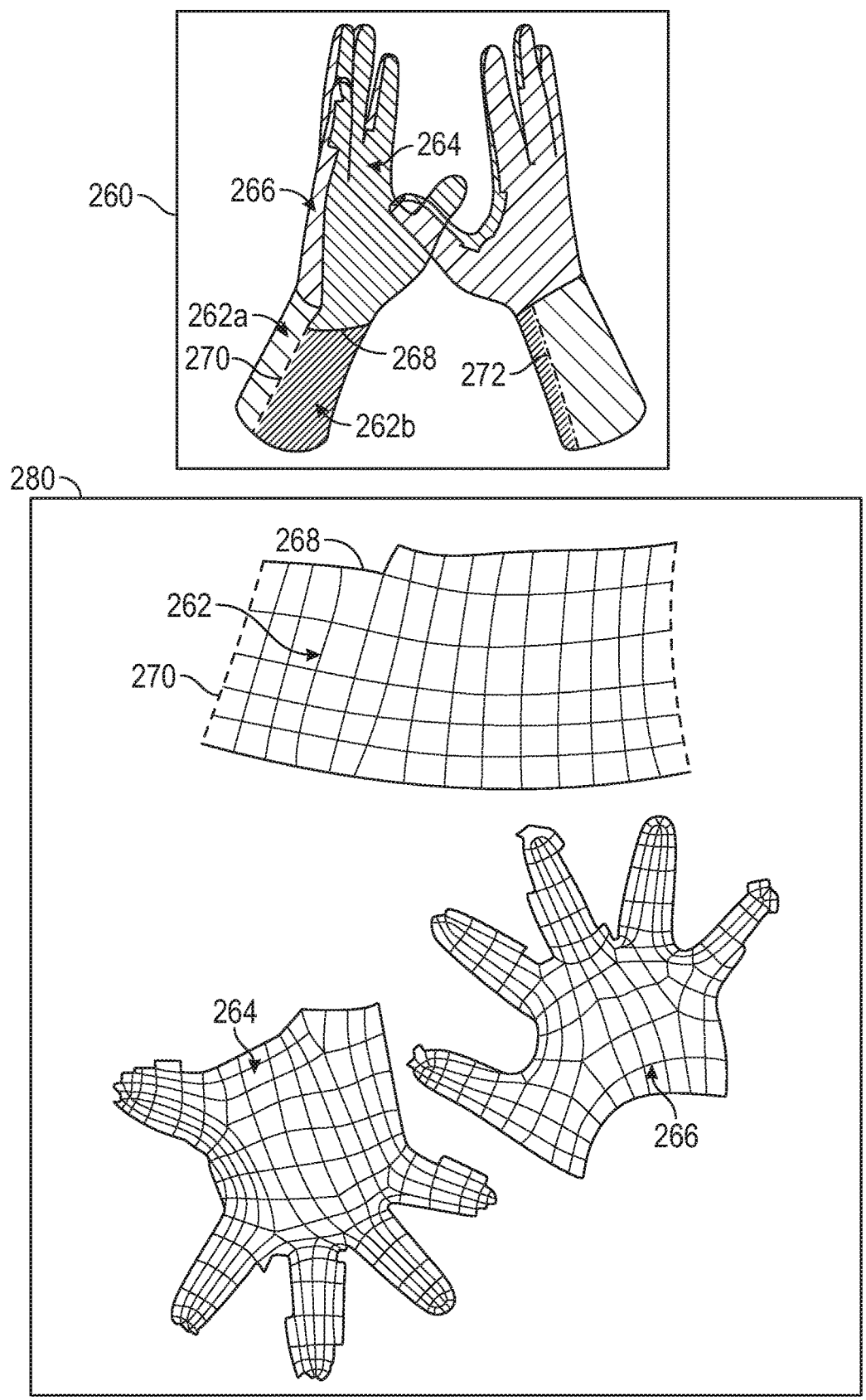

FIG. 2C illustrates techniques for pasting a source UV map $\bar{u}$ (e.g., UV map 210 of FIG. 2A) of a source mesh $\overline{M}$ onto a target mesh M to produce a target UV map u, such as target UV map 280.

The goal of the paste operation is to compute the UV map u that resembles the source map $\bar{u}$ while complying with the connectivity of the target mesh M. Since UV coordinates are allocated at face corners, certain embodiments involve delineating the cut edges in M whose vertices should receive multiple UVs. By duplicating these cut edges, M is decomposed into open sub-meshes and then the parametrizations are transferred to their respective vertices. In certain embodiments, u is completed by gathering the transferred UVs from the sub-mesh vertices back to the face corners of M.

To transfer the cut edges to M, techniques described herein involve leveraging the cut-aware functions generated by the copy operation, as described above with respect FIGS. 2A and 2B. These functions can be evaluated at arbitrary surfaces points on M by locating their correspondences on the source mesh via the surface mapping and then computing the function value. In particular, the patch indicator function $\phi_i$ transferred to M is expressed by ($\phi_i \circ \Gamma$ ): M→R. By layering these transferred indicator functions, a point-based segmentation of M into patches is obtained. For example, at stage 260, the cut-aware functions generated by the copy operation have been used to produce patches 264 and 266, sub-patches 262a and 262b, and a plurality of cuts, such as seam cut 268 and wrap cut 270 on M. Furthermore, artificial curve 272 has been created on M. Artificial curve 272 is considered artificial because it delineates a boundary between sub-patches 262a and 262b that is not present in $\bar{u}$ (e.g., artificial curve 272 is neither a wrap cut nor a seam cut), and is only used as an intermediate step. The harmonic function generated at stage 250 of FIG. 2B is also transferred to M, and is used to determine that artificial curve 272 is artificial. Accordingly, artificial curve 272 is not included in target UV map 280.

When performing the paste operation, the boundaries separating the transferred patches may fail to align to the edges of M, since some of the mesh faces may be overlapped by various patches. Accordingly, as described below with respect to FIG. 3, area coverages of faces may be used to assign faces to patches.

Figure 3:
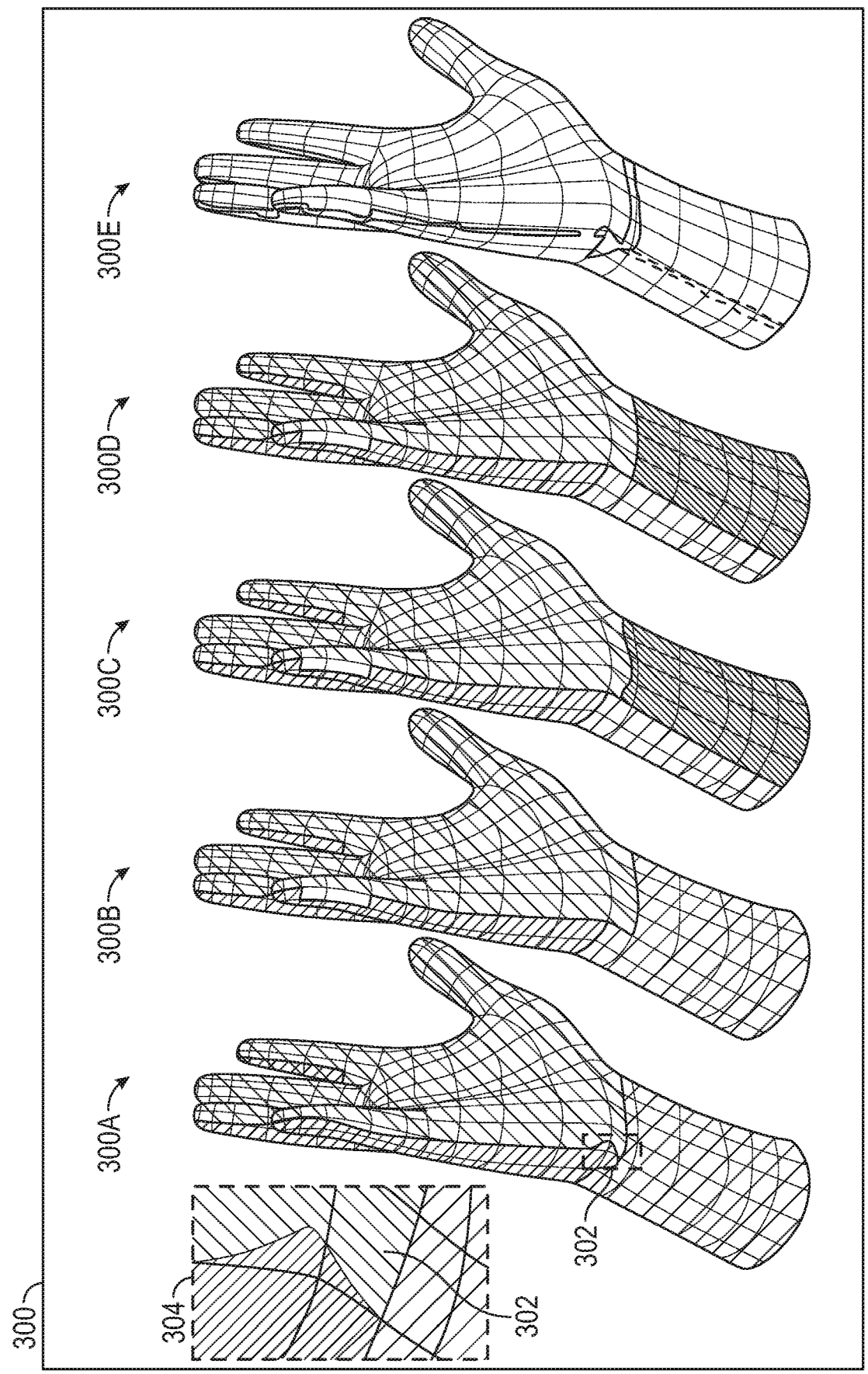
FIG. 3 illustrates example techniques for transferring a UV map to a target mesh.

FIG. 3 illustrates an example 300 of techniques for transferring a UV map to a target mesh M. At 300A, there are certain faces of M that are overlapped by multiple patches. For example, as show in close-up 304 of region 302, face 302 includes multiple patches, represented by different patterns.

To align patch boundaries to mesh edges, certain embodiments involve computing the area coverage of each function $\phi_i$ within each face f in M, and then assembling a vector p that assigns the face f to the patch with the largest coverage. This is expressed in Equation 1:

$$p_f = \mathrm{argmax}_i \int_f (\phi_i \circ \Gamma\ )(x) dx.$$

In other words, the face is assigned to whichever patch covers the largest number of points within the face. In the case of a tie, certain embodiments involve selecting the patch with the smallest index, although other techniques for breaking ties are possible.

The vector p determines a face-based segmentation of M, thus providing a transferred version of the patches encoded by $\bar{p}$ in $\overline{M}$ that conforms to the tessellation of M, as shown at 300B. The seams are then set in M to the edges shared by distinct transferred patches, as shown in FIG. 2C (e.g., seam cut 268 is set to edges of M that are shared by patches 262 and 264).

With the patches and seam cuts reconstructed in M, the wrap cuts are still needed in order to finalize the UV layout. At 300C, wrap curves are deduced by transferring the sub-patch segmentation and the harmonic function associated with each source wrap curve. At 300D, embodiments involve collecting every face f in M assigned to the patch of index i (i.e., $p_f$=i), and computing the vector $s_{ij}$ that maps f to the sub-patch related to the source wrap curve j with the largest area coverage. This is expressed in Equation 2:

$$s_{ij,f} = \operatorname{argmax}_k \int_f (\psi_{ijk} \circ \Gamma)(x)dx.$$

Each vector $s_{ij}$ produces a transferred version of the sub-patches encoded by $\bar{s}_{ij}$ in $\overline{M}$ compelled to the connectivity of M, as illustrated in FIG. 2C (e.g., wrap cut 270 is set to edges of M that are shared by sub-patches 262a and 262b). In some embodiments, misfit points in faces (e.g., points in a given face that were not originally part of the patch or sub-patch with the largest area coverage for the given face) are identified. As shown at 300E, the misfit points that were changed from one patch or sub-patch to another are close to the transferred cuts.

Transferred sub-patches are, by construction, subsets of the transferred patches (e.g., sub-patches 262a and 262b are subsets of patch 262 in FIG. 2C). Certain embodiments involve inspecting each sub-patch segmentation $s_{ij}$ and extracting the edge sequences incident to pairs of sub-patches. These selected curves form the candidate cuts, which can represent either the transferred wrap curve j (e.g., wrap curve 270 of FIG. 2C) or its accompanying artificial curve(s) (e.g., artificial curve 272 of FIG. 2C). To distinguish the wrap curves, embodiments involve calculating the pullback of the harmonic function ($h_{ij} \circ \Gamma$) on M, and evaluating its integral along each candidate curve. In this example, "∘" indicates function composition. This value provides an estimate of the proximity between the candidate curve and the source wrap curve embodied by $h_{ij}$. A candidate curve is then marked as part of the transferred wrap curve by testing if the harmonic function integrated along the curve is greater than zero.

Given a curve with edges $\{e \equiv (v_a, v_b)\}$, the curve integration is approximated by summing the contribution of its edges, yielding Equation 3:

$$\Sigma_{v_a,v_b} \|x_{v_a} - x_{v_b}\| [(h_{ij} \circ \Gamma)(x_{v_a}) + (h_{ij} \circ \Gamma)(x_{v_b})] > 0.$$

Equipped with seam and wrap edges, the transfer of the cut layout to M is completed. The next stage is to transfer the two-dimensional parametrization.

Transferring Two-Dimensional Parametrization from a Source UV Map to a Target UV Map Certain embodiments involve duplicating the cut edges and peeling M into open sub-meshes $\{M_i\}$. Each sub-mesh $M_i$ should receive a parametrization $u_i$ that matches the respective mapping $\bar{u}_i$ as closely as possible. Some techniques may involve evaluating the pullback function ($\bar{u}_i \circ \Gamma$) at the vertices of $M_i$. However, some points in $M_i$ may not have correspondences in $\overline{M}_i$, while other points may have correspondences on the wrong side of a wrap curve. These misfits occur because the target cuts were computed by forcing the transferred segmentations to align to the edges of M and, consequently, the contours of the target sub-meshes may not coincide with the source cuts.

Some embodiments involve identify any misfitting point in M by leveraging the cut-aware functions once again. A point x inside a face f is indicated as a patch misfit if x is not included by the patch containing f, i.e., ($\phi_{p_f} \circ \Gamma$)(x)=0. In some cases, x is also marked as a wrap misfit if there is a wrap curve j inside the patch i≡$p_f$ with transferred functions verifying the conditions: ($\psi_{ijk} \circ \Gamma$)(x)=0 with k≡$s_{ij,f}$ and ($h_{ij} \circ \Gamma$)(x)>0. The former test reveals that x is not covered by the sub-patch assigned to f, thus implying that x is a misfit within the sub-patch segmentation $s_{ij}$, while the latter test detects the sub-patch misfits that are closer to the wrap curve j rather than to its artificial curves. These tests are enclosed into additional indicator functions $\{\eta_f: M \to R\}$, one per face f, that return 0 if x is a misfit in f, and otherwise return 1 reporting x as a valid point. These additional indicator functions are illustrated at 300E, where increased saturation indicates misfit points.

With these validation functions, the parametrization transfer is formulated as an optimization that penalizes the difference between $u_i$ and $\bar{u}_i$ restricted to the valid portion of $M_i$. By expanding the parametrization functions with the matrices $\overline{U}_i$ and $U_i$, interpolated at any surface point x by the vectors ($b_i \circ \Gamma$)(x) and $b_i(x)$, the minimization problem is expressed by Equation 4:

$$\min_{U_i} \Sigma_{f \in M_i} \int_f \eta_f(x) \|b_i(x)^t U_i - (\bar{b}_i \circ \Gamma)(x)^t \overline{U}_i\|^2 dx.$$

Since the target sub-patches are computed based on area coverage, every face in $M_i$ has a non-empty valid region and, therefore, every vertex in $M_i$ is constrained by the barycentric interpolation in its incident faces. As a result, the optimization returns a mapping that extrapolates the UV values from the valid to the misfitting parts of $M_i$, while retaining the distortion of the source parametrization.

The integrals required by Equations 1, 2, and 4 above may be discretized using quadrature points. Samples are scattered uniformly inside each face f of M with sample count set to max(1, $\rho a_f$), where $a_f$ indicates the area of f and $\rho$ is a density parameter. The samples inside f are denoted by $X_f$, and the union of all face samples is indicated by $X = \cup_f X_f$. To account for varying number of samples per face, each sample in $X_f$ is assigned to an area weight $m_f = a_f / |X_f|$, where $|X_f|$ indicates the cardinality of the set $X_f$. Sample points are also grouped per patch $Y_i = \{x \in X: (\phi_i \circ \Gamma)(x) = 1\}$ and sub-patch $Y_{ijk} = \{x \in X: (\psi_{ijk} \circ \Gamma)(x) = 1\}$. With these subsets, the area coverages in Equations 1 and 2 above simplify to Equations 5a and 5b:

$$\int_f (\phi_i \circ \Gamma)(x)dx \approx |X_f \cap Y_i| m_f \quad \text{(Equation 5a)}$$

$$\int_f (\psi_{ijk} \circ \Gamma)(x)dx \approx |X_f \cap Y_{ijk}| m_f \quad \text{(Equation 5b)}$$

For the minimization in Equation 4, the vectors $b_q \equiv (b_i \circ \Gamma)(x_q)$ and $b_q \equiv b_i(x_q)$ are used to indicate the source and target barycentric coordinates evaluated at each sample point $x_q$. Moreover, the misfitting points are removed from $X_f$ by computing the sample subset that verifies the validation test. The valid samples found in f are denoted by $Z_f = \{x \in X_f: \eta_f(x) = 1\}$.

Putting these terms together, Equation 4 is discretized as a least-squares optimization expressed as Equation 6:

$$\min_{U_i} \Sigma_{f \in M_i} m_f (\Sigma_{q \in z_f} \|b^t_q U_i - \bar{b}^t_q \overline{U}_i\|^2).$$

The minimum of Equation 6 corresponds to the solution of a normal equation of the form $(B^t MB)U_i = (B^t M\overline{B})\overline{U}_i$, where B (and, similarly, $\overline{B}$) indicates a matrix that stacks the barycentric coordinates $b_q$ (and, similarly, $\bar{b}_q$) for every valid sample in $M_i$, one per row, and M is a diagonal matrix with entries set to $m_f$ for every sample in $Z_f$. This sparse linear system can be solved efficiently using a Cholesky factorization.

It is noted that a unique solution to Equation 6 can be ensured by making the total number of valid samples in $M_t$ greater than its vertex count, thus making the least-squares problem over-constrained. In the case of low sample count, Equation 6 can be further regularized by perturbing the objective function with a smoothing term such as the discrete Dirichlet energy of $U_t$ on $M_t$.

Example UV Transfer Method

Figure 4:
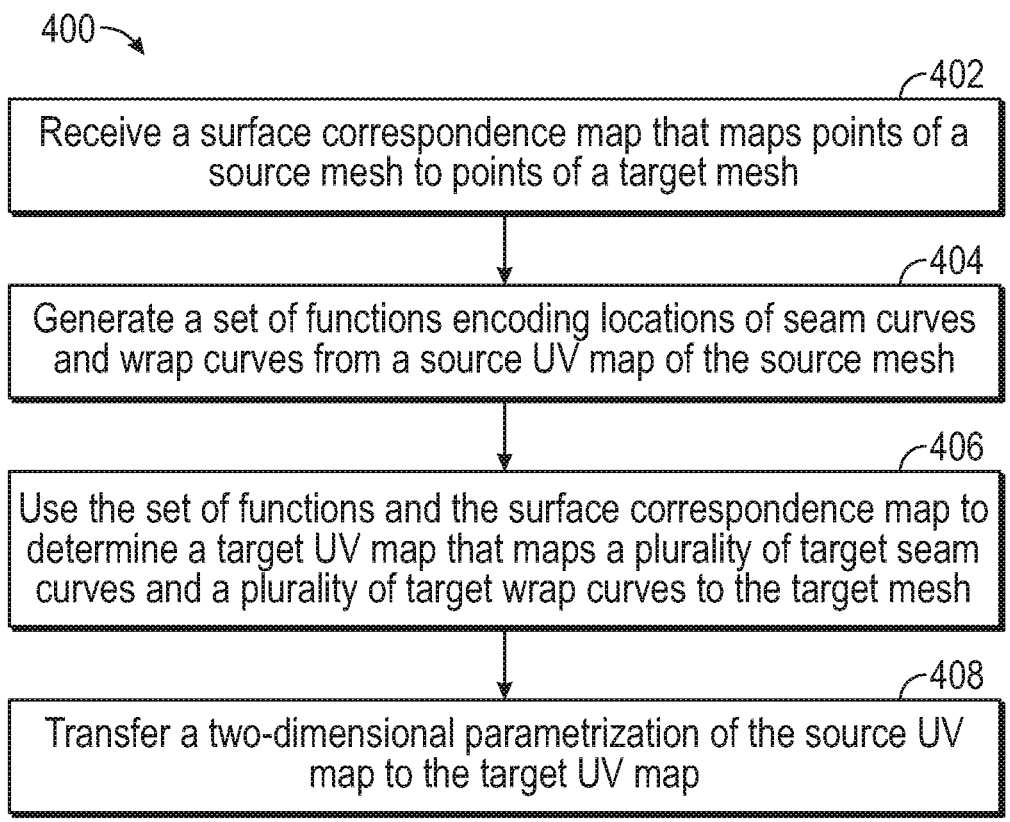
FIG. 4 illustrates example operations for transferring a UV map to a target mesh.

FIG. 4 illustrates example operations 400 for performing UV transfer. In certain embodiments, operations 400 are performed by a computing system, such as computing system 500 of FIG. 5, as discussed below.

At 402, a surface correspondence map is received that maps points of a source mesh to points of a target mesh. In certain embodiments, the surface correspondence map provides a point-to-point mapping from the source mesh to the target mesh. In some cases, the surface correspondence map is computed using correspondence techniques or generated based on spatial projections accelerated by a bounding volume hierarchy (BVH).

At 404, a set of functions is generated that encode locations of seam curves and wrap curves from a source UV map of the source mesh. In some embodiments, generating the set of functions includes generating a plurality of patch indicator functions to indicate the locations of the seam curves based on patches in the source UV map and generating a plurality of sub-patch indicator functions to indicate the locations of the wrap curves based on sub-patches in the source UV map. The set of functions may comprise the plurality of patch indicator functions and the plurality of sub-patch indicator functions. In some embodiments, a set of harmonic functions is generated that corresponds to the plurality of sub-patch indicator functions. The harmonic functions generally represent which curves are wrap curves and which curves are artificial curves. For example, a harmonic function generally indicates the proximity of any surface point within a patch or sub-patch to a wrap curve rather than to any artificial curves. The set of functions may be generated as part of a copy operation, such as the copy operation described above with respect to FIGS. 1-2B.

At 406, the set of functions and the surface correspondence map are used to determine a target UV map that maps a plurality of target seam curves and a plurality of target wrap curves to the target mesh. In some embodiments, this involves transferring the plurality of patch indicator functions to the target mesh to obtain a point-based segmentation of the target mesh into a set of transferred patches and, for each respective face of the target mesh, determining an area coverage of the respective face based on correspondences between points within the respective face and transferred patches of the set of transferred patches and assigning the respective face to a given transferred patch of the set of transferred patches based on the area coverage of the respective face.

In certain embodiments, assigning the respective face to the given transferred patch of the set of transferred patches based on the area coverage of the respective face comprises determining that the area coverage indicates that a majority of the points within the respective face correspond to the given transferred patch. In some embodiments, the plurality of target seam curves are mapped in the target UV map to respective edges of the target mesh that are shared by two or more distinct transferred patches of the set of transferred patches. In some cases, the plurality of sub-patch indicator functions are transferred to the target mesh using harmonic functions (e.g., generated at 404) associated with the plurality of sub-patch indicator functions to map the plurality of target wrap curves in the target UV map to particular edges of the target mesh. In some embodiments, the target UV map is determined using a paste operation, such as the paste operation described above with respect to FIGS. 2C and 3.

At 408, a two-dimensional parametrization of the source UV map is transferred to the target UV map. In some embodiments, transferring the two-dimensional parametrization of the source UV map to the target UV map comprises identifying misfit points of the target mesh based on whether each point in the target mesh was in a minority in the area coverage of a given face of the target mesh and transferring the two-dimensional parametrization of the source UV map to the target UV map using an optimization that penalizes differences between the source UV map and the target UV map for points other than the misfit points of the target mesh. In some embodiments, operations 400 involve the use of one or more equations described above, such as Equations 1-6.

Example Computing System for UV Transfer

Figure 5:
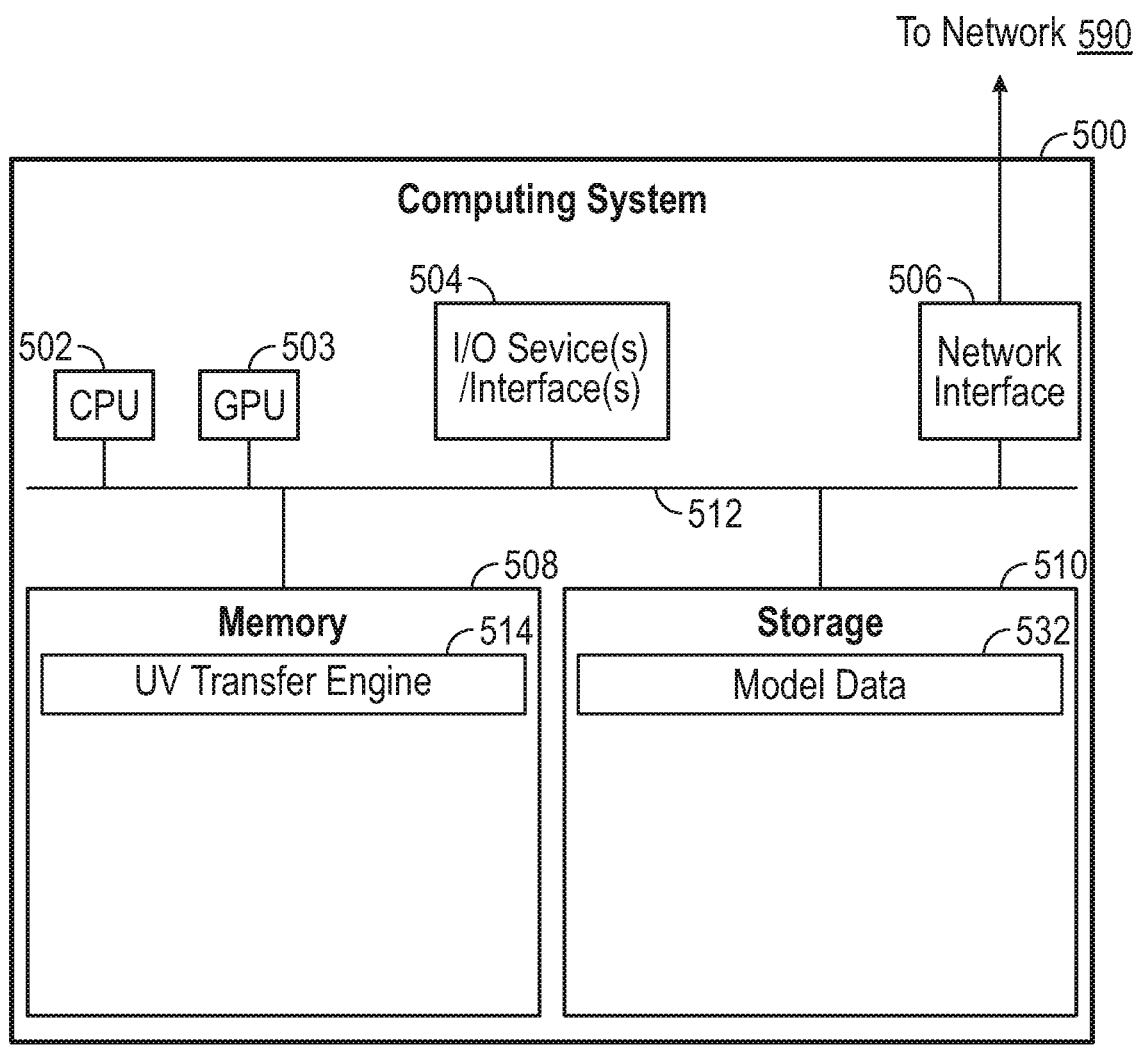
FIG. 5 illustrates an example computing system with which embodiments of the present disclosure may be implemented.

FIG. 5 illustrates an example computing system 500 with which embodiments of the present disclosure may be implemented.

In certain embodiments, computing system 500 performs techniques described herein for transferring a UV map from a source mesh to a target mesh, such as operations 400 of FIG. 4.

Computing system 500 includes a central processing unit (CPU) 502 and a GPU (graphics processing unit) 503 connected to a data bus 512. CPU 502 and/or GPU 503 are configured to process computer-executable instructions, e.g., stored in memory 508 or storage 510, and to cause computing system 500 to perform methods as described herein, for example with respect to FIG. 4. Though depicted as including one CPU 502 and one GPU 503, computing system 500 may alternatively have a single processor or a plurality of processors.

Computing system 500 further includes input/output device(s) and interface(s) 504, which allows computing system 500 to interface with input/output devices, such as, for example, keyboards, displays, mouse devices, pen input, and other devices that allow for interaction with computing system 500. Note that while not depicted with independent external I/O devices, computing system 500 may connect with external I/O devices through physical and wireless connections (e.g., an external display device).

Computing system 500 further includes network interface 506, which provides computing system 500 with access to external networks, such as network 590, and thereby external computing devices.

Computing system 500 further includes memory 508, which in this example includes UV transfer engine 514, which may perform operations described above with respect to FIG. 1-4, such as operations 400 of FIG. 4. Note that while shown as a single memory 508 in FIG. 5 for simplicity, the aspects stored in memory 508 may be stored in different physical memories, but all accessible to CPU 502 and/or GPU 503 via data connections, such as bus 512.

Computing system 500 further includes storage 510, which in this example includes model data 532. Model data 532 generally represents data related to models, such as source meshes, target meshes, UV maps, surface correspondence maps, textures, functions, and the like.

While not depicted in FIG. 5, other aspects may be included in storage 510.

As with memory 508, a single storage 510 is depicted in FIG. 5 for simplicity, but the various aspects stored in storage 510 may be stored in different physical storages, but all accessible to CPU 502 and/or GPU 503 via internal data connections, such as bus 512, I/O interfaces 504, or external connection, such as network interface 506.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for cut-aware UV transfer, comprising:
    receiving a surface correspondence map that maps points of a source mesh to points of a target mesh;

generating a set of functions encoding locations of seam curves and wrap curves from a source UV map of the source mesh, wherein generating the set of functions comprises:
  generating a plurality of patch indicator functions to indicate the locations of the seam curves based on patches in the source UV map; and
  generating a plurality of sub-patch indicator functions to indicate the locations of the wrap curves based on sub-patches in the source UV map, wherein the set of functions comprises the plurality of patch indicator functions and the plurality of sub-patch indicator functions;
using the set of functions and the surface correspondence map to determine a target UV map that maps a plurality of target seam curves and a plurality of target wrap curves to the target mesh, wherein using the set of functions and the surface correspondence map to determine the target UV map comprises:
  transferring the plurality of patch indicator functions to the target mesh to obtain a point-based segmentation of the target mesh into a set of transferred patches;
  for each respective face of the target mesh:
    determining an area coverage of the respective face based on correspondences between points within the respective face and transferred patches of the set of transferred patches; and
    assigning the respective face to a given transferred patch of the set of transferred patches based on the area coverage of the respective face, wherein assigning the respective face to the given transferred patch of the set of transferred patches based on the area coverage of the respective face comprises determining that the area coverage indicates that a majority of the points within the respective face correspond to the given transferred patch;
  mapping the plurality of target seam curves in the target UV map to respective edges of the target mesh that are shared by two or more distinct transferred patches of the set of transferred patches; and
  transferring the plurality of sub-patch indicator functions to the target mesh using harmonic functions associated with the plurality of sub-patch indicator functions to map the plurality of target wrap curves in the target UV map to particular edges of the target mesh; and
transferring a two-dimensional parametrization of the source UV map to the target UV map.

2. The method of claim 1, wherein transferring the two-dimensional parametrization of the source UV map to the target UV map comprises:
  identifying misfit points of the target mesh based on whether each point in the target mesh was in a minority in the area coverage of a given face of the target mesh; and
  transferring the two-dimensional parametrization of the source UV map to the target UV map using an optimization that penalizes differences between the source UV map and the target UV map for points other than the misfit points of the target mesh.

3. A non-transitory computer readable medium comprising instructions that, when executed by one or more processors, causes the one or more processors to perform a method for cut-aware UV transfer, the method comprising:
  receiving a surface correspondence map that maps points of a source mesh to points of a target mesh;
  generating a set of functions encoding locations of seam curves and wrap curves from a source UV map of the source mesh, wherein generating the set of functions comprises:
    generating a plurality of patch indicator functions to indicate the locations of the seam curves based on patches in the source UV map; and
    generating a plurality of sub-patch indicator functions to indicate the locations of the wrap curves based on sub-patches in the source UV map, wherein the set of functions comprises the plurality of patch indicator functions and the plurality of sub-patch indicator functions;
  using the set of functions and the surface correspondence map to determine a target UV map that maps a plurality of target seam curves and a plurality of target wrap curves to the target mesh, wherein using the set of functions and the surface correspondence map to determine the target UV map comprises:
    transferring the plurality of patch indicator functions to the target mesh to obtain a point-based segmentation of the target mesh into a set of transferred patches;
    for each respective face of the target mesh:
      determining an area coverage of the respective face based on correspondences between points within the respective face and transferred patches of the set of transferred patches; and
      assigning the respective face to a given transferred patch of the set of transferred patches based on the area coverage of the respective face, wherein assigning the respective face to the given transferred patch of the set of transferred patches based on the area coverage of the respective face comprises determining that the area coverage indicates that a majority of the points within the respective face correspond to the given transferred patch;
    mapping the plurality of target seam curves in the target UV map to respective edges of the target mesh that are shared by two or more distinct transferred patches of the set of transferred patches; and
    transferring the plurality of sub-patch indicator functions to the target mesh using harmonic functions associated with the plurality of sub-patch indicator functions to map the plurality of target wrap curves in the target UV map to particular edges of the target mesh; and
  transferring a two-dimensional parametrization of the source UV map to the target UV map.

4. The non-transitory computer readable medium of claim 3, wherein transferring the two-dimensional parametrization of the source UV map to the target UV map comprises:
  identifying misfit points of the target mesh based on whether each point in the target mesh was in a minority in the area coverage of a given face of the target mesh; and
  transferring the two-dimensional parametrization of the source UV map to the target UV map using an optimization that penalizes differences between the source UV map and the target UV map for points other than the misfit points of the target mesh.

5. A system, comprising one or more processors and a non-transitory computer readable medium comprising instructions that, when executed by the one or more processors, cause the system to perform a method for cut-aware UV transfer, comprising:
  receiving a surface correspondence map that maps points of a source mesh to points of a target mesh;

generating a set of functions encoding locations of seam curves and wrap curves from a source UV map of the source mesh, wherein generating the set of functions comprises:
   generating a plurality of patch indicator functions to indicate the locations of the seam curves based on patches in the source UV map; and
   generating a plurality of sub-patch indicator functions to indicate the locations of the wrap curves based on sub-patches in the source UV map, wherein the set of functions comprises the plurality of patch indicator functions and the plurality of sub-patch indicator functions;
using the set of functions and the surface correspondence map to determine a target UV map that maps a plurality of target seam curves and a plurality of target wrap curves to the target mesh, wherein using the set of functions and the surface correspondence map to determine the target UV map comprises:
   transferring the plurality of patch indicator functions to the target mesh to obtain a point-based segmentation of the target mesh into a set of transferred patches; and
   for each respective face of the target mesh:
      determining an area coverage of the respective face based on correspondences between points within the respective face and transferred patches of the set of transferred patches; and
      assigning the respective face to a given transferred patch of the set of transferred patches based on the area coverage of the respective face, wherein assigning the respective face to the given transferred patch of the set of transferred patches based on the area coverage of the respective face comprises determining that the area coverage indicates that a majority of the points within the respective face correspond to the given transferred patch; and
   transferring a two-dimensional parametrization of the source UV map to the target UV map, wherein transferring the two-dimensional parametrization of the source UV map to the target UV map comprises:
      identifying misfit points of the target mesh based on whether each point in the target mesh was in a minority in the area coverage of a given face of the target mesh; and
      transferring the two-dimensional parametrization of the source UV map to the target UV map using an optimization that penalizes differences between the source UV map and the target UV map for points other than the misfit points of the target mesh.

6. The system of claim 5, wherein using the set of functions and the surface correspondence map to determine the target UV map further comprises mapping the plurality of target seam curves in the target UV map to respective edges of the target mesh that are shared by two or more distinct transferred patches of the set of transferred patches.

7. The system of claim 6, wherein using the set of functions and the surface correspondence map to determine the target UV map further comprises transferring the plurality of sub-patch indicator functions to the target mesh using harmonic functions associated with the plurality of sub-patch indicator functions to map the plurality of target wrap curves in the target UV map to particular edges of the target mesh.

* * * * *